Nov. 29, 1966　　　D. D. HAMILTON　　　3,288,313
BOOM AND GRAPPLE

Filed June 19, 1964　　　12 Sheets-Sheet 1

Nov. 29, 1966  D. D. HAMILTON  3,288,313
BOOM AND GRAPPLE

Filed June 19, 1964  12 Sheets-Sheet 2

Nov. 29, 1966   D. D. HAMILTON   3,288,313
BOOM AND GRAPPLE
Filed June 19, 1964   12 Sheets-Sheet 3
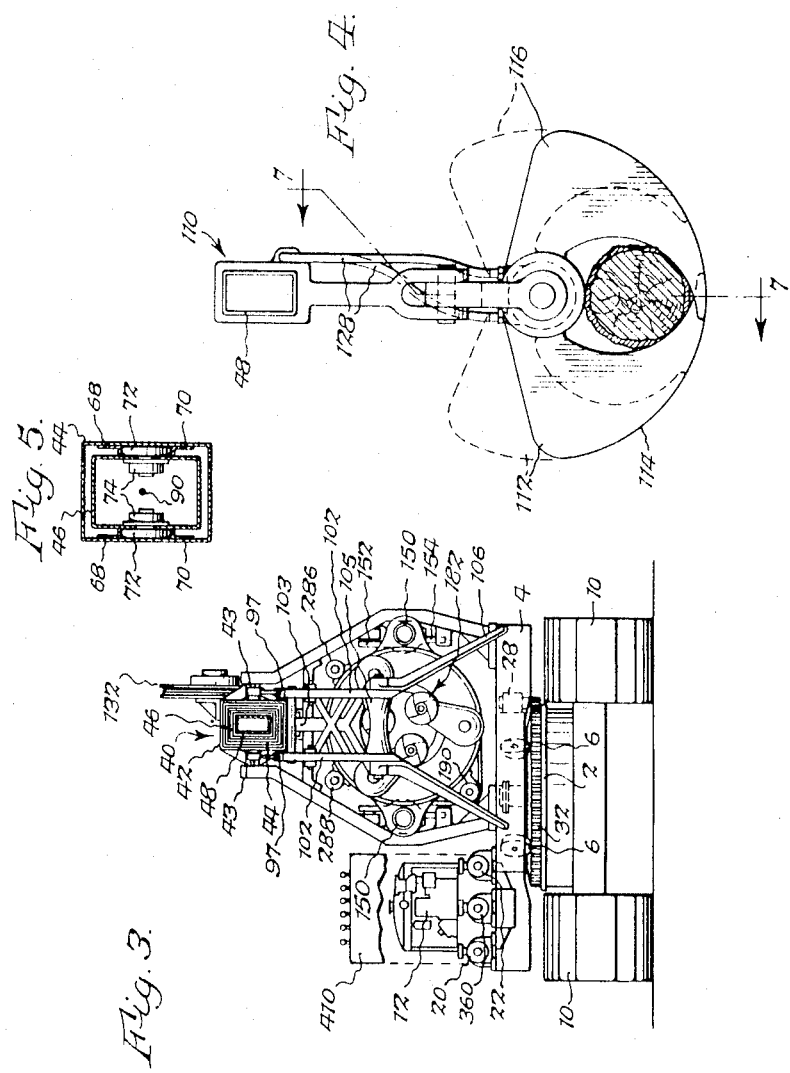

Nov. 29, 1966  D. D. HAMILTON  3,288,313
BOOM AND GRAPPLE
Filed June 19, 1964  12 Sheets-Sheet 4
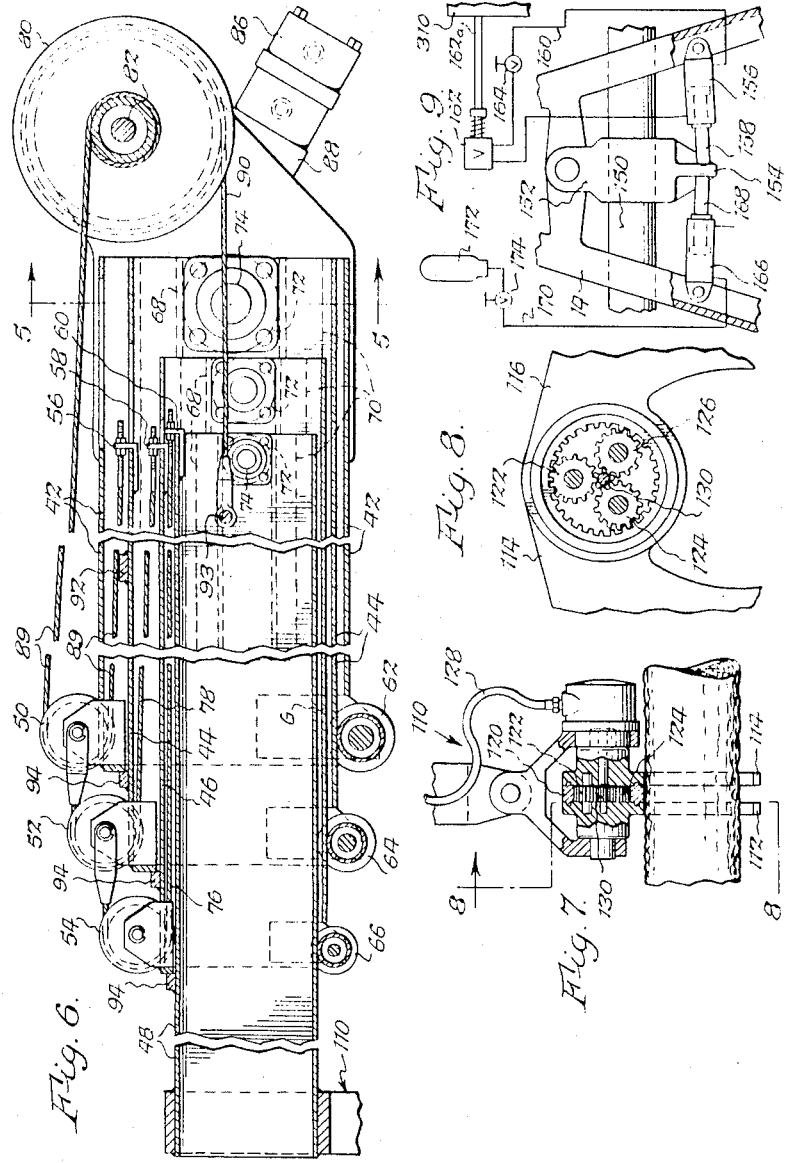

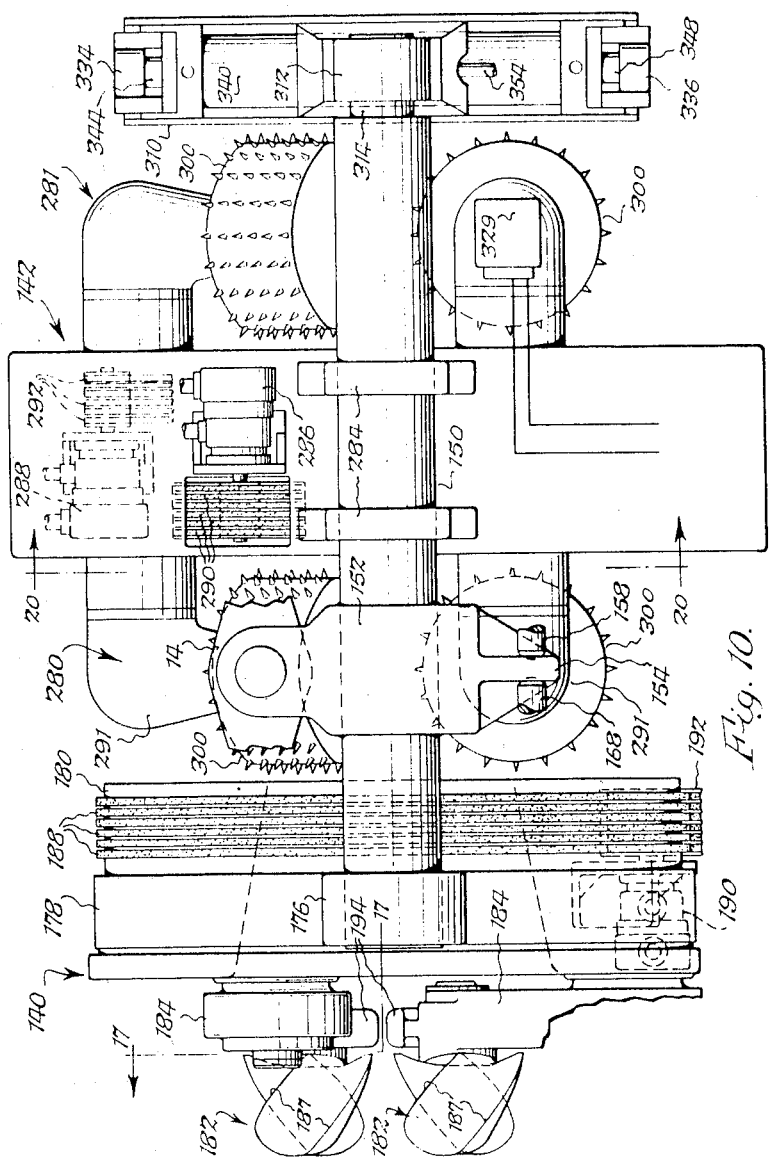

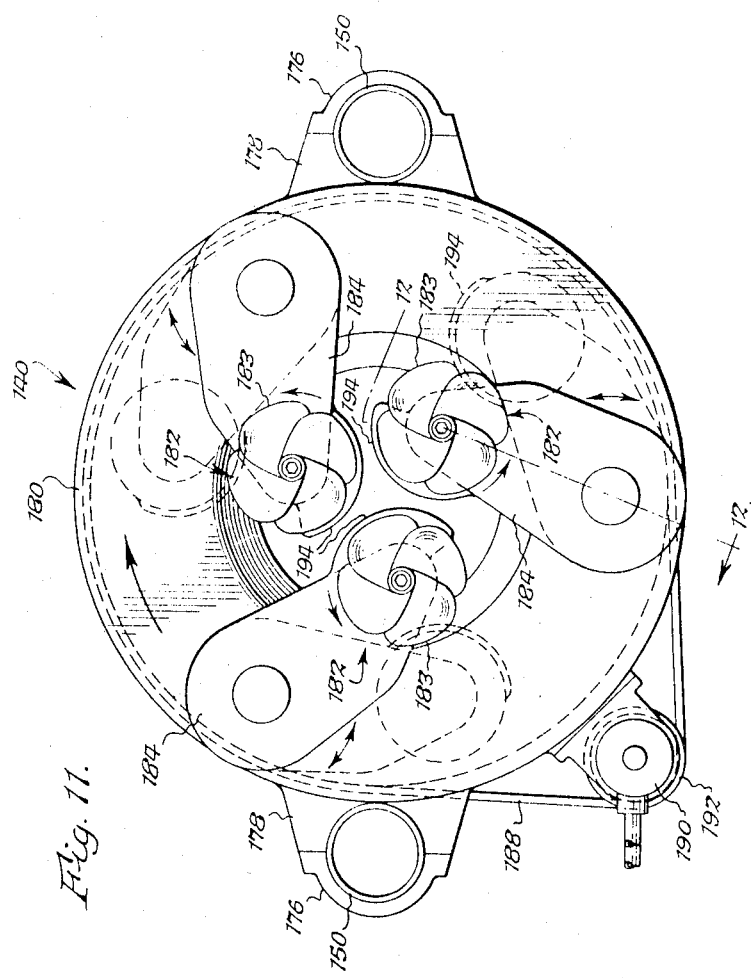

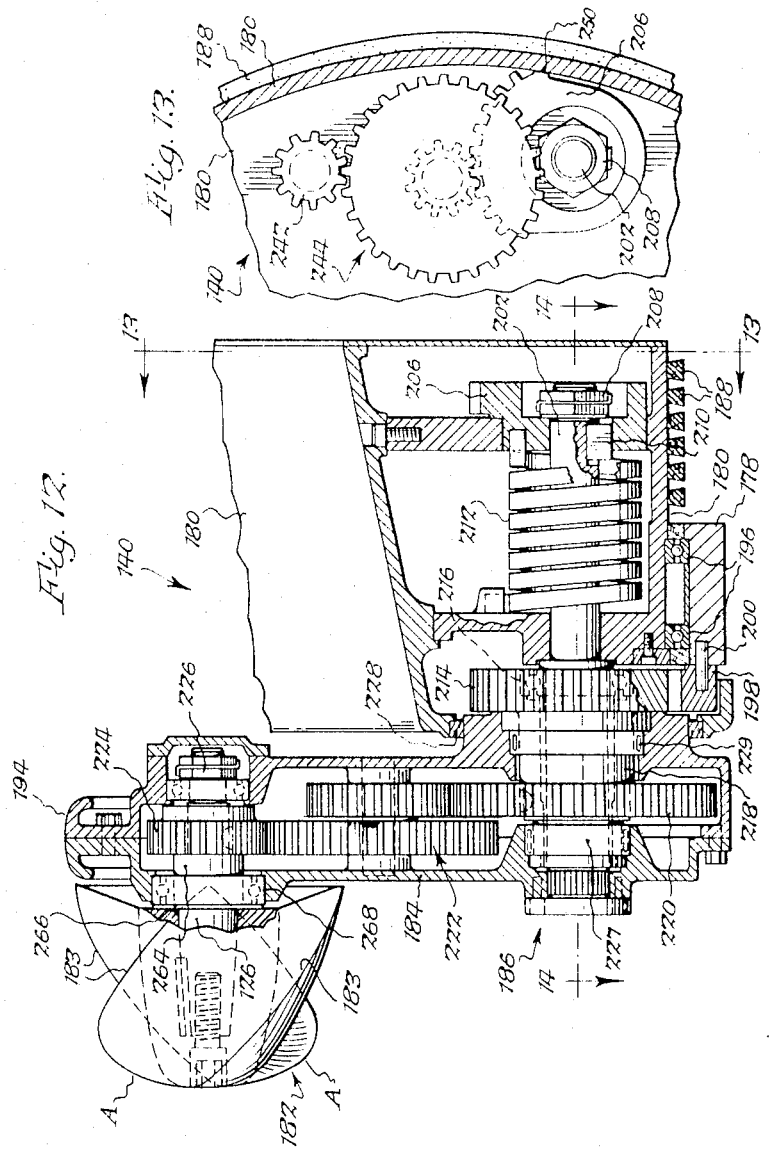

Nov. 29, 1966  D. D. HAMILTON  3,288,313
BOOM AND GRAPPLE
Filed June 19, 1964  12 Sheets-Sheet 8
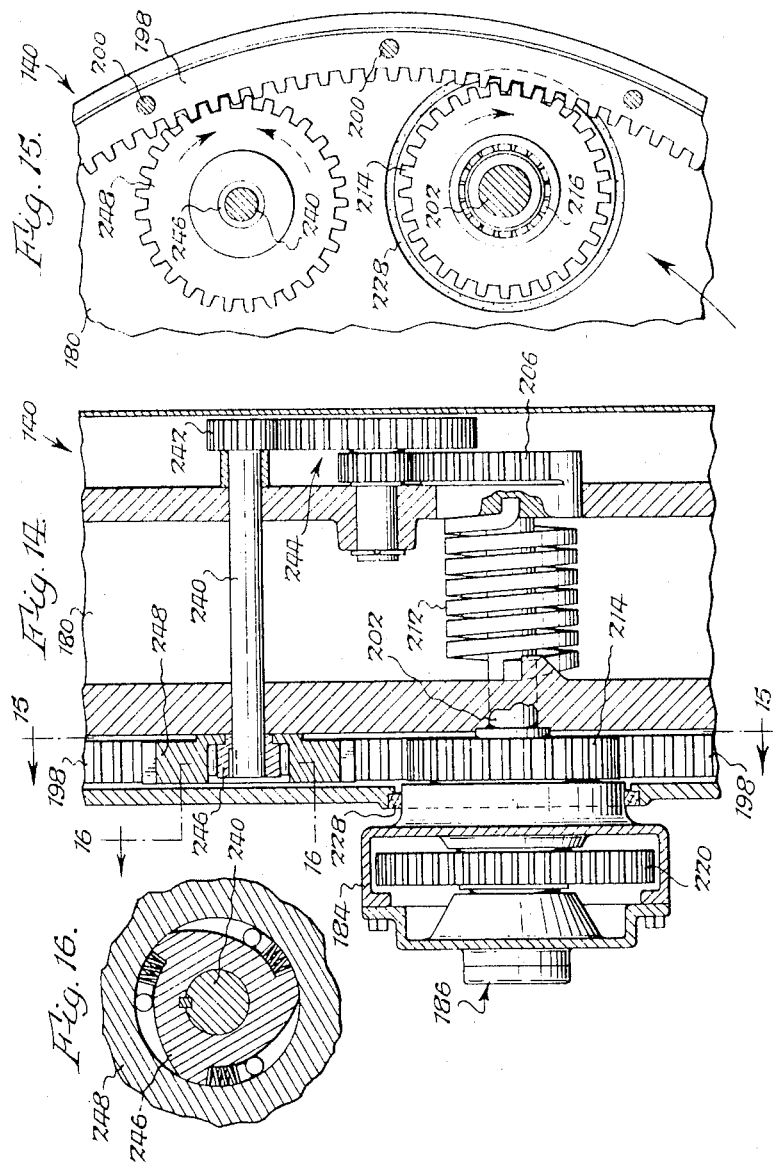

Nov. 29, 1966   D. D. HAMILTON   3,288,313
BOOM AND GRAPPLE
Filed June 19, 1964   12 Sheets-Sheet 9
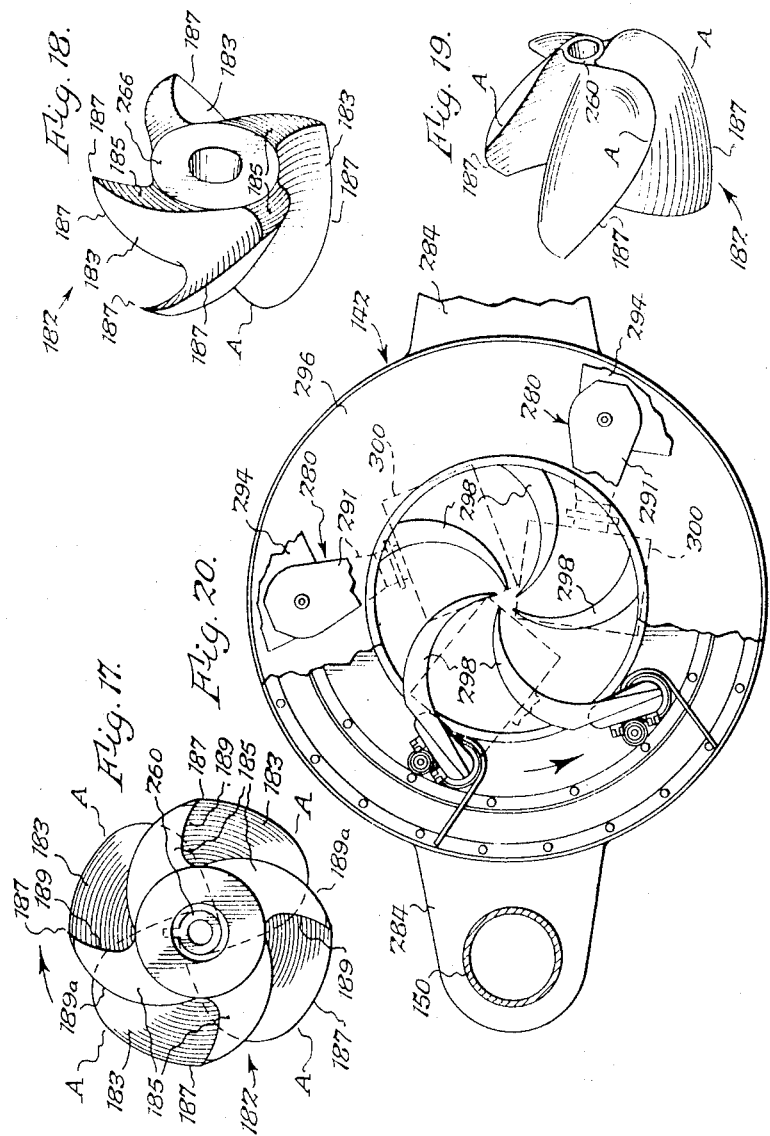

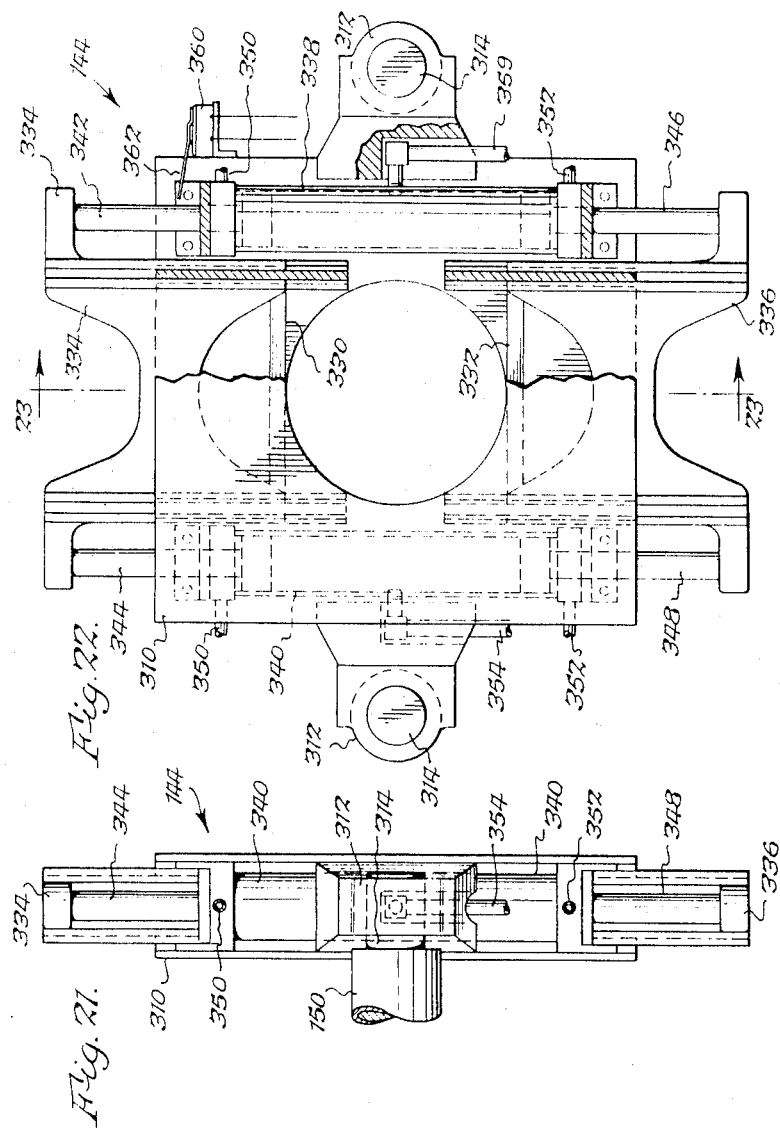

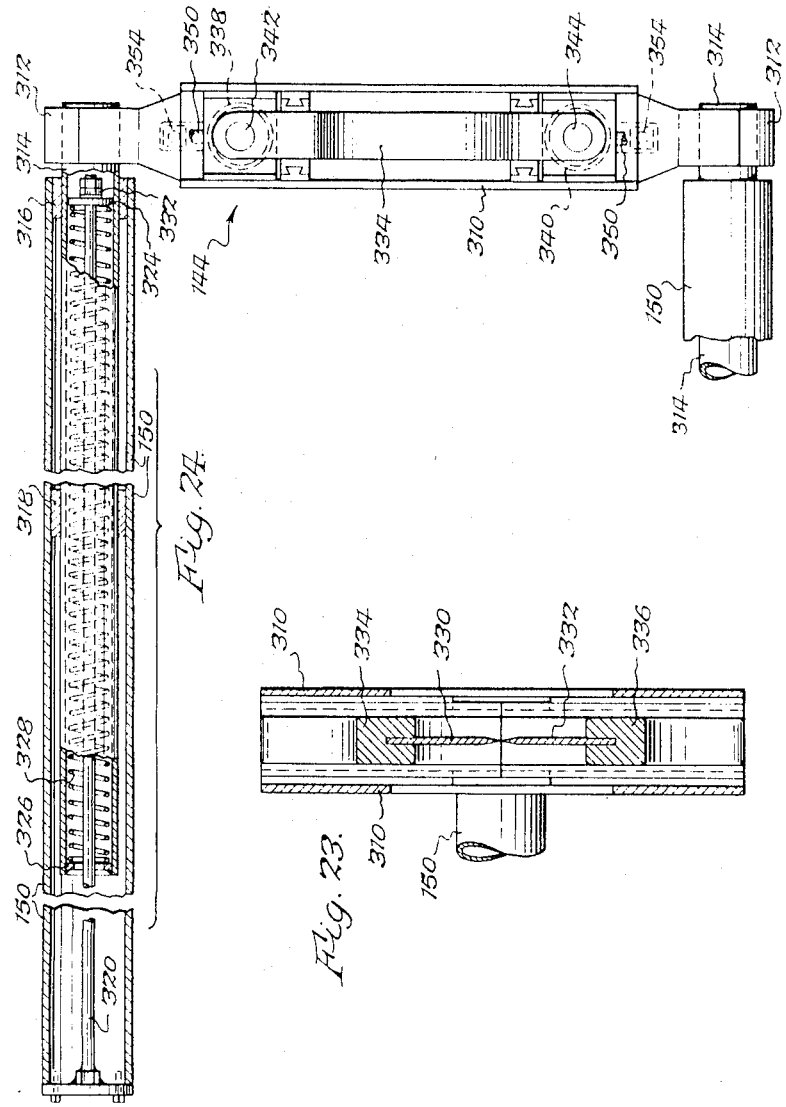

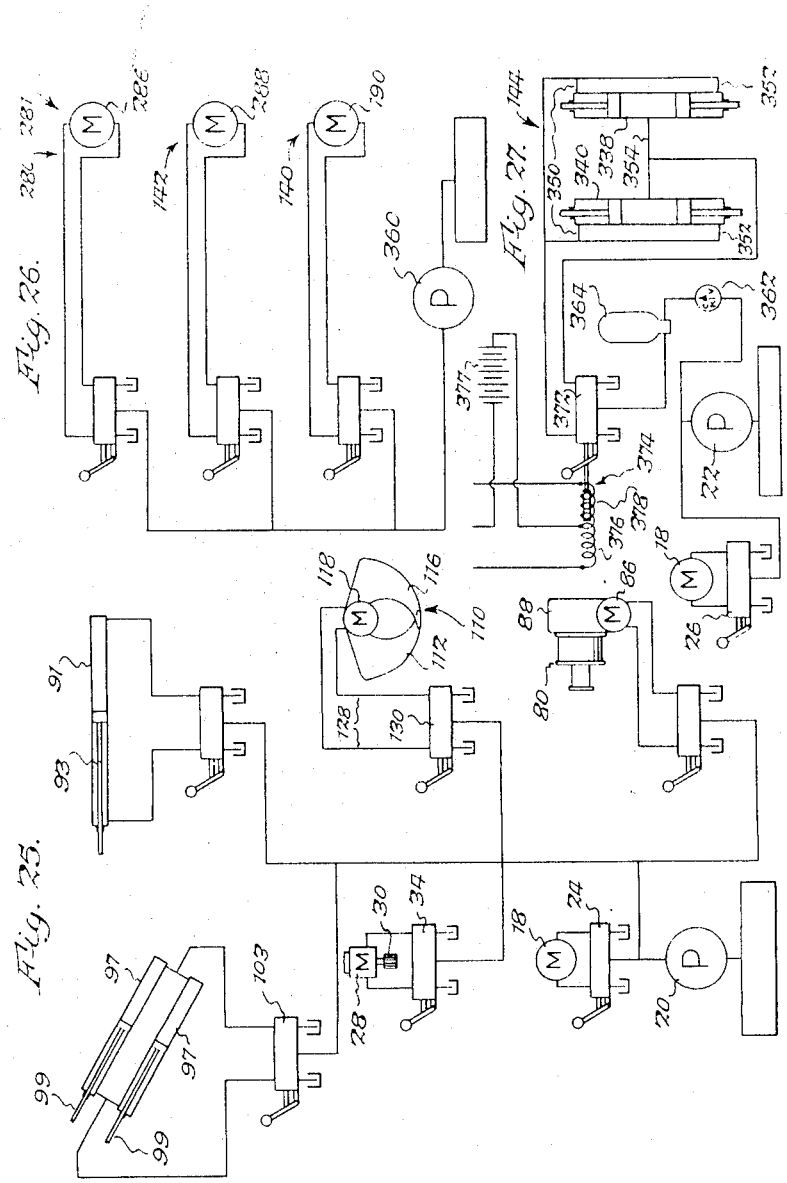

United States Patent Office 3,288,313
Patented Nov. 29, 1966

3,288,313
BOOM AND GRAPPLE
Douglas D. Hamilton, 258 Brookfield Ave.,
Mount Royal, Quebec, Canada
Filed June 19, 1964, Ser. No. 376,530
9 Claims. (Cl. 214—147)

This invention relates to the art of processing raw timber. In the present continuation-in-part application of United States patent application Serial No. 40,294, there is provided means for picking up a selected prefelled tree from a plurality of such prefelled trees.

In a timber operation of the type to which this invention particularly relates, trees are felled in the forest, the limbs removed and the trunk or bole is cut into predetermined lengths, called bolts, which are then transported to the mill. To a large extent, the removal of the limbs has been performed by hand after felling. Since, particularly in processing pulp wood, the bark cannot be used, the bark has to be removed. This has been done as a separate operation, usually at the mill, by removing the bark from each of the cut sections or bolts. Thus, in processing wood for pulp, after the tree has been felled, the tree has been passed through three separate and distinct processing steps, the first, to remove the limbs, the second, to remove the bark and the third to cut the debarked and delimbed tree into sections. Processing trees in this manner has been time-consuming and costly.

In the parent application, there was provided a unitary machine which in a continuous operation delimbs (and preferably also debarks) a felled tree and cuts the delimbed tree into logs of a predetermined length thereby to simplify and expedite the processing of felled trees and minimize handling of the tree.

Now, by the present continuation-in-part application, there is provided a machine which can pick up a selected prefelled tree from a plurality of such prefelled trees.

Still a further object of the invention is to provide such a machine that is mobile and self-propelled and can be moved and operated by a single operator.

According to a broad aspect of this continuation-in-part application, there is provided a boom for feeding a selected prefelled tree along an axial path; said boom comprising: a support mounted for rotation around a vertical longitudinal axis; a first member pivotally mounted on said support for limited movement about said pivot whereby an extremity of said member may be raised or lowered, means for raising and lowering said extremity and means for actuating said means; a plurality of members telescoped within said first member; guide means comprising cooperating rollers on said telescoped members cooperating with said fixed and said telescoped members for supporting and guiding said plurality of members for movement into and out of said first member and of each other; means interconnecting said first member and said plurality of members for simultaneously extending said plurality of members outwardly from said first boom and relative to each other to lengthen said boom and for moving said members inward simultaneously into said first member and with respect to each other to shorten the boom; means for actuating said interconnecting means; a grapple fixed to the innermost of said plurality of members, said grapple including jaws pivotally mounted for movement about a substantially horizontal axis; and means for pivoting said jaws about said axis to open and close said jaws. Preferably, the boom includes heeling means. Optionally, the interconnecting means of the boom includes a bidiameter winch drum drivenly mounted on said first fixed member; a first cable wound on a large diameter of said bidiameter winch drum, entraining a first pulley at the outer end of said first fixed member and operatively associated with the inner end of the first telescoping member of said plurality of members, whereby to interconnect a member with another member telescoped therein; a plurality of interconnecting means, for interconnecting a primary member, a secondary member telescoped therein and a tertiary member telescoped in the secondary member, as required, each including a cable secured to the outer end of the primary member, entraining a pulley at the outer end of the secondary member and operatively associated with the inner end of the tertiary member; and a cable operatively associated with the innermost telescoped member and wound on the small diameter of said winch drum, the ratio of the large diameter to the small diameter being equal to the number of movable telescoped members.

In the accompanying drawings,

FIG. 3 is a front elevation view of the machine of FIG. 1 with the front end of the boom cut off in order to show other parts;

FIG. 4 is a front elevation view of the grab end of the boom with the grab jaws partially closed in engagement with a tree trunk;

FIG. 5 is a vertical section view through the boom along line 5—5 of FIG. 6;

FIG. 6 is an enlarged vertical section view through the length of the boom showing the opposite ends of the boom, the center section is broken away;

FIG. 7 is a side view, partially in section, along the line 7—7 of FIG. 4, showing the planetary gear arrangement for actuating the grab jaws;

FIG. 8 is a vertical section view, along line 8—8 of FIG. 7, showing the pinions, spurs and ring gear of one of the grab jaws;

FIG. 9 is a fragmentary side elevation view showing the pivotal mounting of the delimbing and debarking mechanism on the frame;

FIG. 10 is an enlarged side elevation view of the delimber, debarker and chopper;

FIG. 11 is an enlarged front elevation view of the delimber with the delimber drive motor;

FIG. 12 is an enlarged vertical section view taken along one arm of the delimber on line 12—12 of FIG. 11;

FIG. 13 is a fragmentary end view along the line 13—13 of FIG. 12;

FIG. 14 is a fragmentary view, in section, taken along the line 14—14 of FIG. 12;

FIG. 15 is a sectional view along the line 15—15 of FIG. 14;

FIG. 16 is a fragmentary view, in section, along the line 16—16 of FIG. 14;

FIG. 17 is an end view of the delimber cutter head taken from the rear of the cutter head along the line 17—17 of FIG. 10;

FIG. 18 is a view in perspective of the delimber cutter head taken from one side at the rear of the cutter head;

FIG. 19 is a view in perspective of the delimber cutter head taken from one side at the front of the cutter head;

FIG. 20 is a front elevation view, partly in section, of the delimber and feed roll mechanism taken along the line 20—20 of FIG. 10;

FIG. 21 is a side elevation view of the cut-off knife;

FIG. 22 is a vertical elevation view of the cut-off knife, partly in section, taken from the rear;

FIG. 23 is a vertical section view through the cut-off knife taken along the line 23—23 of FIG. 22;

FIG. 24 is a top plan view of the cut-off knife, the spring tensioned extension arms being shown partially in section; and FIGS. 25, 26 and 27 are schematic diagrams of the power units and controls for the various component units of the machine.

Figure 1:
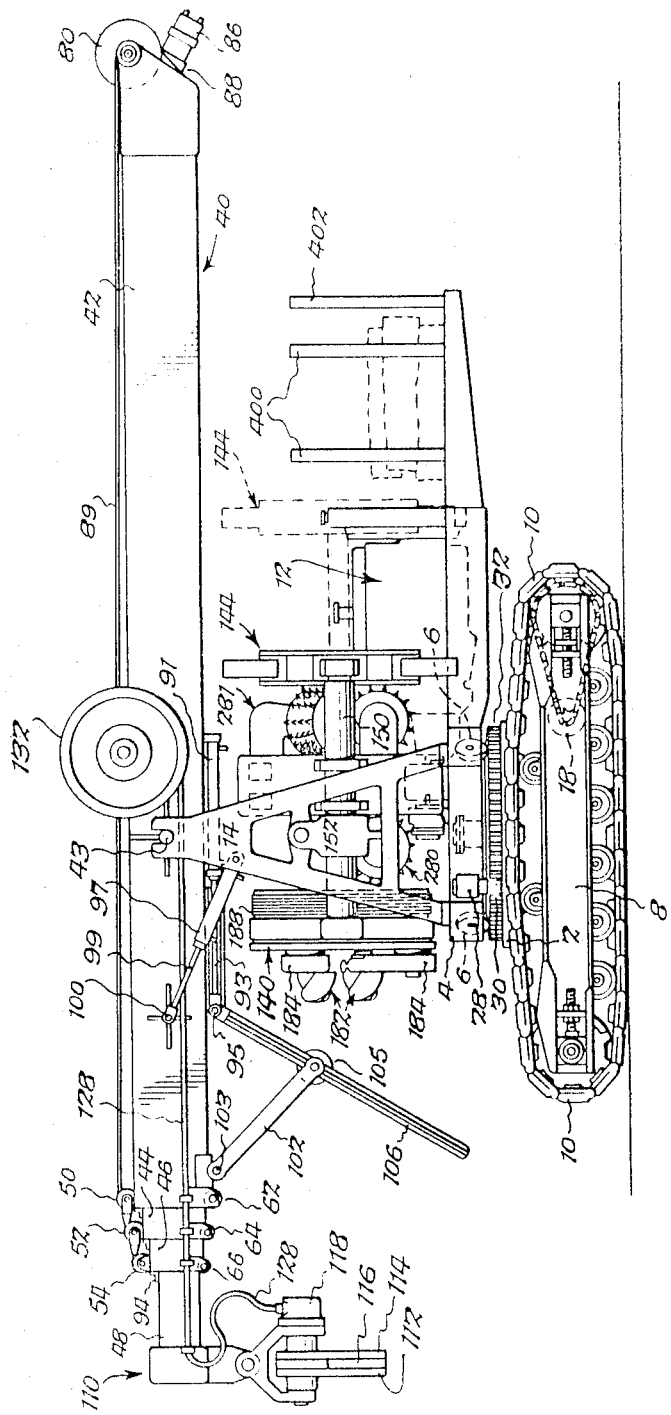
FIG. 1 is a side elevation view of a preferred embodiment of the machine of the invention with the boom retracted.

As illustrated in the drawings, the present invention provides a unitary machine for processing felled trees in the forest and includes a grapple for engaging and feeding felled trees into the machine, a delimber for removing limbs from the tree trunk, a debarker for removing the bark from the delimbed trunk and shears or knives for cutting the delimbed and debarked trunk into preselected lengths. The processing machine is mounted on a self-propelled tractor provided with treads and may be readily moved from place to place in the forest. After a tree has been felled and is lying on the ground, the processing machine of the invention is moved into position, the trunk of the tree is engaged by the grapple and the tree trunk is fed into the machine. As the tree passes through the machine, the limbs and bark are removed from the trunk and the delimbed and debarked trunk is then cut into preselected lengths and deposited in a cradle carried on the machine. The processed cut sections are then removed from the cradle and transported to a mill.

The self-propelled tractor and the processing units of the machine are powered from a single power plant which may be a diesel or gasoline engine or other suitable power source, each unit being controlled from controls conveniently located at a central control point on the machine. Thus, the entire machine may be operated by one man, the operator first moving the machine into position in the forest and then, from the central control point, selecting a felled tree, engaging the selected tree with the grapple, elevating and feeding the tree into the machine where the limbs and bark are removed from the tree and the remaining tree trunk is cut into pre-selected lengths. Thus, through the machine of the invention, a single operator can take felled trees, as they lie on the ground in the forest, and completely process the tree, removing the limbs and bark, and cutting the tree trunk into sections. As discharged from the machine, the sections are transported to the mill.

The delimbing, debarking, feed mechanism, shears and cradle of the machine are mounted on the tractor in substantially horizontal, tandem alignment and the grapple, provided with adjustable jaws, is carried at the end of an extensible boom mounted above the processing units. The processing units and the boom are mounted for rotation together about a vertical axis on the tractor base, the boom being pivoted to allow lowering and raising of the grapple. Hence, with the tractor positioned, the machine can be operated to process felled trees lying on the ground around the tractor and outwardly to the reach of the fully extended boom.

Figure 2:
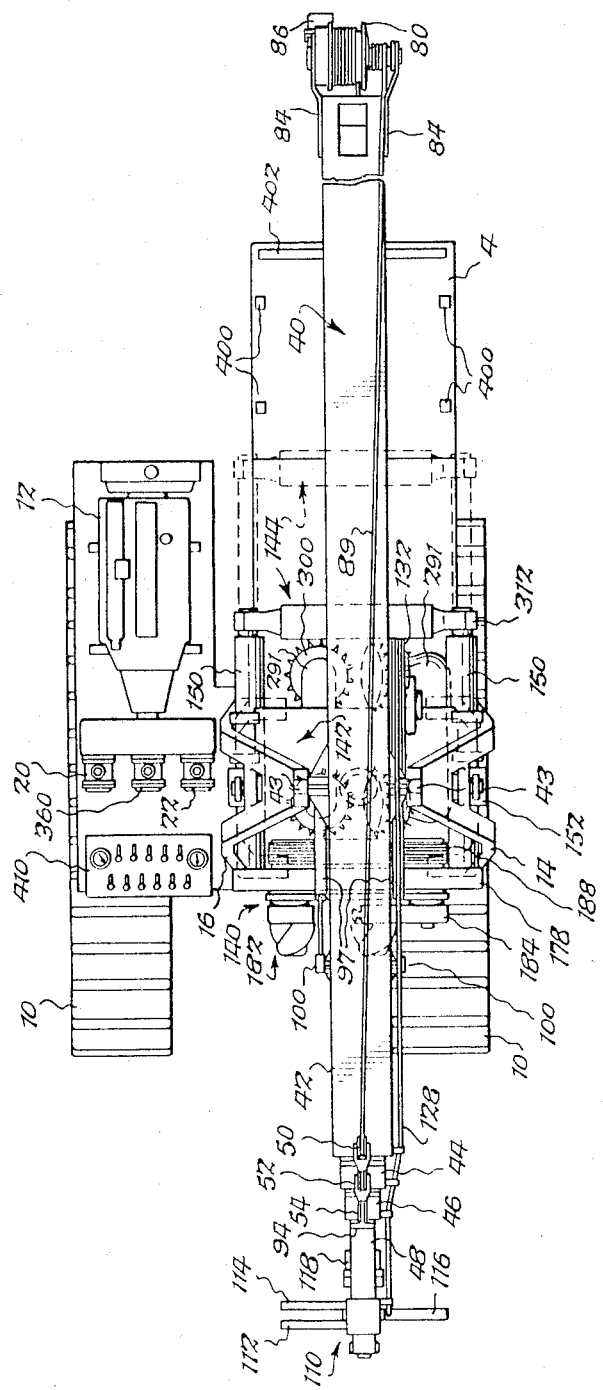
FIG. 2 is a top plan view of the machine of FIG. 1.

Referring now to the drawings, illustrating a preferred embodiment of the invention, in FIGS. 1 and 2 there is shown a machine having a base 2 and frame 4, the frame 4 being mounted for rotation on base 2 by a plurality of wheels 6 rotatably carried on suitable pins on the bottom of frame 4 and positioned for rotation in a track on base 2. Base 2 and frame 4 are carried on a tractor 8 provided with treads 10, base 2 being mounted on the tractor intermediate treads 10 (FIG. 3), and frame 4 extending outward beyond the base over treads 10 and rearward beyond the back of the treads when the machine is in its normal traveling position.

A suitable power plant 12, either a diesel or gas engine or other suitable power source, is mounted at one side of frame 4 over one of the treads 10 and, at the other side, frame 4 is provided with upwardly extending supports 14, 16. Driving units, such as hydraulic motors 18, are connected to each of the treads 10 and are powered from pumps 20, 22 driven by power plant 12, the feed to motors 18 being controlled by valves 24, 26 (FIGS. 25 and 27) positioned in the lines between motors 18 and pumps 20, 22 respectively to regulate movement and steer tractor 8. Hydraulic motor 28, carried on frame 4 drives pinion 30 in engagement with ring gear 32 fixed to base 2, motor 28 being powered from pump 20 and controlled by valve 34 to rotate frame 4 about a vertical axis on base 2. Obviously, other suitable drives, well known in the art, may be substituted as driving connections between power plant 12, treads 10 and frame 4.

As best shown in FIG. 3, supports 14, 16 extend outwardly away from each other intermediate their ends and inwardly toward each other, at their tops, forming an enlarged area between the supports intermediate frame 4 and the top of the supports. At the top, supports 14, 16 are each provided with a recess in which the boom, generally indicated 40, is supported for pivotal movement.

As best shown in FIGS. 1 and 6, boom 40 includes four members 42, 44, 46, 48 arranged to telescope within each other, the outer boom member 42 being provided with trunnions 43 extending outwardly from either side of member 42 and pivotally seated in the recesses formed in the ends of frame members 14, 16. Boom members 42, 44, 46 are each provided at the top of their forward end with a pulley 50, 52, 54 respectively and, at their rear or telescoped end, members 44, 46, 48 are each provided with an upstanding lug 56, 58, 60. At the bottom of their forward ends, members 42, 44, 46 are each provided with a roller 62, 64, 66 respectively, the roller on each boom member providing a support and guide for the forward end of the received telescoping member. As best shown in FIG. 5, on the inside of the opposing vertical walls of each of the boom members 44, 46, 48 is provided spaced tracks 68, 70, the tracks extending longitudinally of the boom member. Wheels 72, provided with bearings 74, are affixed to the outer sides of the vertical walls of boom members 42, 44, 46 and are positioned to run in the tracks 68, 70 of the adjacent telescoping boom member, the wheels 72 providing a support and guide for the rear end of the telescoping members.

Cable 76 is attached at one of its ends to lug 60 on boom member 48, at its opposite end to the axle of pulley 52 carried on boom member 44 and intermediate its ends passes over pulley 54. Cable 78 is attached at one of its ends to lug 58 on boom member 46, at its opposite end to the axle of pulley 50 carried on boom member 42, and intermediate its ends passes over pulley 52.

Drum 80 is rotatably mounted on shaft 82 carried by support 84 attached to the rear end of boom member 42, drum 80 being powered by a suitable motor, such as hydraulic motor 86, operatively connected to drum 80 through reduction gear 88. Drum 80 is provided with two cables 89, 90 wound in opposite directions on the drum. Thus, as viewed in FIG. 6, cable 89 is reeled onto the drum and cable 90 is unreeled from the drum as the drum is rotated clockwise and vice versa. At its forward end, cable 89 is attached to lug 56 on boom member 44 and, intermediate its ends passes over pulley 50 carried on the forward end of boom 42. Cable 90 at its forward or free end is attached to lug 93 affixed to boom member 48. By the interconnecting cables between the respective boom members, as drum 80 is turned clockwise the boom members slide outward, extending the boom and, as the drum 80 is turned counterclockwise, the boom members telescope inward retracting or shortening the boom. Suitable stops, such as 92, 94, shown on member 44 in FIG. 6, are provided on each of the inner boom members 44, 46, 48, to limit the inward and outward movements of the boom members.

Referring now to FIG. 1, double acting cylinders 97, pivotally connected to supports 14, 16 respectively, are each provided with a piston and piston rod 99, pivotally connected at 100 on opposite sides of boom member 42. Cylinders 97 are connected to pump 20 through valve 103 (FIG. 25) to extend and retract piston and piston rods 99 in cylinders 97 pivoting boom 40 on trunnions 43 to raise and lower the forward end of the boom.

Double acting cylinder 91 is fixed to boom member 42 intermediate supports 14, 16 and is provided with piston and piston rod 93. Concave guide roll 105 is rotatably mounted between a pair of Y-shaped linkages 106, 102 carried at either side of the forward end of boom 40, linkage members 102 being connected at fixed pivots 103 to the opposite sides of boom member 42 and linkage members 106 being pivoted at 95 to the forward end of piston and piston rod 93, the movement of piston and piston rod 93 in cylinder 91, through pivot 95, raising and lowering guide roll 105 with respect to boom 40. At their free ends beneath guide roll 105, linkage members 106 extend outwardly (FIG. 3).

At its forward or telescoping end, boom 40 is provided with a grab or grapple means, generally indicated 110 (FIGS. 1 and 2), the grab or grapple means being attached to the forward end of boom member 48. Thus, as boom 40 is extended, the grapple means is extended outwardly away from the tractor and, as the boom is retracted, the grasping means returns inwardly toward the tractor.

Referring now to FIGS. 4, 7 and 8, grapple means 110 comprises pivotally associated jaws mounted to operate in opposite directions in a plane substantially transverse to the axis of the boom. As viewed in FIG. 4, the jaw on the left hand side includes two plates 112, 114 and the jaw on the right hand side has a single plate 116, the plate 116 being mounted intermediate plates 112, 114 for movement between plates 112, 114 as the plates are closed or brought together.

As shown in FIGS. 7 and 8, the plates are actuated by a suitable motor means, such as hydraulic motor 118, motor 118 opening and closing the plates through the action of a planetary gear system. Ring gear 120 is fastened to plate 116 and planetary gears 122, 124, 126 are carried on suitable shafts, mounted at their opposite ends in spaced plates 112, 114. A pinion 130, in driving engagement with planetary gears 122, 124, 126, is attached to the shaft of motor 118. Thus, when motor 118 is operated in one direction, the plates are opened, and in the opposite direction, the plates are closed. Motor 118 is connected to pump 20 by hydraulic lines 128 through control valve 130 (FIG. 25), lines 128 being carried on a spring controlled reel 132 rotatably supported on boom 40. Spring controlled reel 132 allows hydraulic lines 128 to unreel as boom 40 is extended and, through its spring control, re-reels lines 128 as the boom is retracted.

The delimber, generally indicated 140, the debarker, generally indicated 142, and the shears, or knives, generally indicated 144, are supported in aligned, tandem position between supports 14, 16 on a pair of horizontally spaced tubular beams 150, delimber 140 and debarker 142 being fixed to tubular beams 150 and shears 144 being mounted for axial movement with respect to the beams as will be described hereinafter.

Tubular beams 150 are pivotally connected to supports 14, 16, respectively, by collar members 152 fixed to each of the beams 150, a collar member 152 pivotally connecting one of the beams 150 to support 14 on a trunnion fixed to the support at a point above beam 150 and an identical collar member 152 pivotally connecting the other beam 150 to support 16 at a trunnion fixed to the support at a point above the beam. As best shown in FIG. 9, each of the collars 152 projects below beam 150 and terminates in a shoulder 154 positioned between the adjacent walls of supports 14, 16, respectively. Double acting cylinders 156 are pivotally connected to supports 14, 16, respectively, and each cylinder is provided with a piston and piston rod 158 connected at its end to shoulder 154 of respective collar members 152. A hydraulic line 160 is attached to the opposite ends of cylinder 156 on opposite sides of the piston rod and piston 158 forming a fluid by-pass around piston rod and piston 158. Spring closed valve 162 and manual valve 164 are connected in by-pass line 160 for purposes more clearly described hereinafter. Cylinders 166 are pivotally connected to frames 14, 16, respectively, at the opposite side of shoulder 154, cylinders 166 each containing piston and piston rod 168 connected at its end to shoulder 154. A hydraulic line 170 connects cylinder 166 with an accumulator 172, a mandrel valve 174 being positioned in line 170 between cylinder 166 and accumulator 172. Thus, beams 150 are supported for pivotal movements on supports 14, 16, respectively, by collar members 152, the pivotal movement of the beam with respect to supports 14, 16 being controlled by cylinders 156, 166, as will be described hereinafter.

As shown in FIG. 11, delimber 140 is positioned vertically on tubular beams 150, the delimber being connected to the respective beams by collars 176 and includes a stationary housing 178 fixed by collars 176 to beams 150 and a rotating housing 180 carried on stationary housing 178. A plurality of cutter heads 182 are each rotatably carried on an arm 184 pivoted at 186 on rotatable housing 180. Each cutter head 182 includes a plurality of cutter blades 183, in the present instance four, spaced equidistant about a hub 185 fixed on a shaft 226 rotatably mounted on an arm 184. Housing 180 is driven by a plurality of belts 188 operatively connected to hydraulic motor 190 through pulley 192, belts 188 passing around housing 180.

Cutter heads 182 and arms 184 are operated by motor 190 through a gear arrangement, popularly known as a rotary ring unit, in which the arms 184 are yieldingly urged inward toward the center of the delimber, a work-engaging stop 194 being carried by the inner ends of each of the arms 184 to prevent cutter heads 182 from digging into the tree trunk as the trunk is fed through the cutter heads.

Referring now to FIG. 12, rotatable housing 180 is supported on bearings 196 carried in stationary housing 178. Ring gear 198 is fixed by pins 200 to stationary housing 178. The drive for each cutter head 182 includes a shaft 202 rotatably positioned in a boss 204 formed in rotatable housing 180, gear segment 206 being keyed at 210 to one end of shaft 202 and fixed thereon by lock nuts 208. A helical spring 212 is carried on each of the shafts 202 and is fixed at one of its ends to gear segment 206 and at its other end to a lug on boss 204 on rotary housing 180. Rotation of each of the shafts 202 in housing 180 is restrained by the action of helical spring 212.

Gears 214 are rotatably mounted on bearing 216 carried on shaft 202 adjacent boss 204, gear 214 being provided with an outwardly extending sleeve 218. Gear 220 is keyed to sleeve 218. A cluster gear 222, rotatably carried in each of the arms 184, is in engagement with gear 220 and with a gear 224 carried at the outer end of each of arms 184. Gear 224 is keyed to shaft 226 of cutter head 182. Intermediate gear 224 and cutter head 182, shaft 226 is provided with a hub 264 rotatably supporting shaft 226 and cutter head 182 in bearing 268 fixed in arm 184. A shoulder 266 is fixed to shaft 226 as a thrust surface to limit inward movement of head 182 on arm 184. A spline at the forward end of shaft 202 connects arm 184 to shaft 202. Arm 184 is pivotally supported on shaft 202 by means of bearings 227 and 229 and is provided with a seal 228 affixed to the housing.

When the rotating ring 180 is rotated in one direction by motor 190 and belts 188, through the gear train between ring gear 198 and cutter heads 182, the cutter heads 182 are rotated and spring 212 yieldably presses work engaging stop 194 and cutter heads 182 toward the center of the delimber as viewed in FIG. 11.

As shown in FIGS. 13, 14, 15 and 16, to move arms 184 and cutter heads 182 away from each other to open the heads to receive a tree trunk, the gear train is rotated in a direction opposite to that previously described. A shaft 240 is mounted in housing 180 parallel to shaft 202 and is provided at its rearward end with a gear 242 in driving engagement with cluster gear 244 which in turn is in driving contact with the gear teeth of gear segment 206. At its forward end, shaft 240 is connected through a one-way clutch 246 and gear 248 with ring gear 198. When motor 190 is turning ring gear 198 in a clockwise direction as viewed in FIG. 11, driving heads 182 and pivoting arms 184 inward, clutch 246 is disengaged, shaft 240 and gears 242, 244 remaining stationary. When motor 190 is reversed, turning ring gear 198 in a counterclockwise direction, clutch 246 engages, causing shaft 240 and gears 242, 244 to turn gear segment 206. Through shaft 202 keyed to gear segment 206, arms 184 and cutter heads 182 are moved outwardly away from each other providing a larger opening for introduction of a tree trunk to be delimbed and processed in the machine.

As best shown in FIG. 13, rotation of gear segment 206 is limited by the contact of stop 250 on gear segment 206 with housing 180, a suitable hydraulic by-pass being provided in hydraulic motor 190 to permit it to stall the motor when stop 250 contacts housing 180. As soon as the tree trunk is positioned between the cutter heads, motor 190 is reversed disengaging clutch 246. Arm 184 is then free to return inwardly to engage surface 194 and heads 182 with the tree trunk.

In operation, a tree is fed axially through the delimber assembly by a feed means yet to be described in detail while housing 180 is rotated clockwise as viewed in FIG. 11, carrying arms 184 and cutter heads 182 clockwise around the tree. At the same time, each of the delimber cutter heads 182 is rotating counterclockwise on its shaft 226 at a relatively high speed. The cutter head guides 194, which trail the blades 183 on each head in their clockwise rotation with housing 180, follow the surface contours of the tree trunk under the influence of the springs 212. Thus, each of the rotating cutter heads 182 scans or sweeps a generally spiral path closely adjacent to and about the tree trunk. The blades 183 of each cutter head 182 are so shaped that in their rotation about their shafts 226 a portion thereof sweeps out a generally cylindrical volume the surface of which is maintained generally parallel to and in close spaced rotation with the surface of the tree trunk. These portions of the cutter blades 183 are long enough axially so that the aforementioned spiral paths overlap to some extent thereby insuring that at the rate the tree is fed and housing 180 is rotated, any projection such as a tree limb which escapes the effective cylindrical cutting periphery of one rotating head will be intercepted by the next cutter head.

While the cutter blades 183 on each head 182 may vary in number and configuration, important advantages are attained in accordance with the present invention, particularly minimization of shock and enhanced smoothness and efficiency in operation, when the blades 183 are shaped and arranged as shown most clearly in FIGS. 11, 17, 18 and 19. The blades 183 are carried on and distributed in equally spaced relation about an elongated hub 260 which is tapered from a smaller forward end to a relatively larger diameter at its rearward end. Each of the blades has a root portion 185 which extends axially along the hub 260 and merges therewith, with the root portion tapering adjacent to its forward end to a relatively small cross sectional thickness. Each blade 183 extends radially outward from its hub 260 and helically therealong to provide a cutting edge 187 which from its rear end forward to a point A adjacent to the forward end thereof sweeps out a generally cylindrical volume when rotated. From point A forward and radially inward to the nose of hub 260 the cutting edge 187 is curved so that this portion sweeps out a generally hemispherical volume when the blade rotates. To provide a smoothly shaped blade the curvature is such that the radius of the hemisphere described by the rotation of the forward portion of the blade is substantially equal to the radius of the cylinder of revolution formed by the remainder of the blade, the hemisphere being tangent to the cylinder. The curvature of the forward portion of the cutting edge, that is, the curvature of the small circle which it follows along the hemisphere of revolution is determined by the direction of the helix or the helix angle at point A where the two portions of the edge merge smoothly. The spherically curved forward edge portion ensures that the blades in their rotation will not strike a projection of the tree which, due to the relative motion between the tree and the cutter heads in the axial direction, would otherwise be struck by the blades after they have passed beyond their cutting postion relative to the tree as they rotate on their hub 260.

The spiral or helical disposition of the portion of each cutting edge 187 from its rearward end to point A is such that point A leads the rearward end of the blade by somewhat less than 90° of revolution of hub 260. Reaction forces developed as the blade is carried through its cutting position where a projection on the tree is being cut, because of the spiral inclination of the cutting edge, are in a direction to minimize shock.

It may also be noted that the side surface 189 of each of the blades, that is, the leading side surface as the blade rotates about the axis of hub 260. is concave while the opposite surface 189a is convex.

Referring to FIGS. 10 and 20, debarker 142 and feed roll mechanisms 280, 281 are positioned behind delimber 142 on tubuar beams 150, and are connected to the respective beams by collars 284. Any suitable debarker and feed roll mechanism may be employed. However, the debarker and feed roll mechanism shown in U.S. Patent No. 2,857,945 to P. G. Brundell et al., dated Oct. 28, 1958, is preferred. In utilizing this debarking and feed roll mechanism, it has been found desirable to provide separate power sources for the debarker and the feed rolls. Thus, a motor, such as hydraulic motor 286, is provided to drive the feed roll mechanisms 280, 281 and a motor, such as hydraulic motor 288, to drive debarker 142. These motors are connected to the feed roll mechanism and the debarker by pulleys and V-belts 290, 292, respectively.

Debarker 142 includes stationary housing 294 fixed to beams 150 by collars 284 and rotatable housing 296, carrying a pluraltiy of arcuate blades 298, rotatable housing 296 being driven by motor 288 in driving connection with the housing through pulley and V-belts 292.

Feed roll mechanisms 280, 281 each comprise a triangulated arrangement of three spiked rolls 300, the three spiked rolls of mechanism 280 being positioned at the forward or infeed side of debarker 142 and the spiked rolls of mechanism 281 being positioned at the outfeed side of the debarker. Each spiked roll 300 is journaled for rotation about an axis parallel to the infeed and outfeed sides of the debarker at one end of an L-shaped arm 291 pivotally supported at its opposite end on stationary housing 294. Arms 291 are spaced around housing 294 and through a driving arrangement, such as shown in U.S. Patent No. 2,857,945, spiked rolls 300 are driven and arms 291 are pivoted on housing 294 to drivingly engage the peripheral spiked surface of rolls 300 with a tree trunk positioned between the rolls. Thus, feed roll mechanisms 280, 281 are driven by motor 286 and pulley and V-belts 290 and, as a tree trunk is positioned between the rolls 300, mechanism 280 feeds the trunk into debarker 142, mechanism 281 receiving and removing the debarked trunk from the debarker. For reasons which will be more apparent hereinafter, a counter switch 329 is fixed to an end of one of the rolls 300, preferably at the outfeed side of the delimber, switch 329 being set to actuate automatically after each pre-set number of rotations of roll 300.

In normal operation, motor 286 and pulley and V-belts 290 rotate rolls 300 on feed roll mechanism 280 toward, and rolls 300 on feed roll mechanism 281 away from, debarker 142, feed roll mechanism 281 feeds the tree out of debarker 142. In some instances, after a tree has been fed partially through debarker 142, it may be desired to remove the tree from the debarker without passing the remainder of the tree through the debarker. This may be accomplished readily by reversing motor 286 and pulley and V-belts 290. When reversed, motor 286 drives pulley and V-belts 290 in a reverse direction, rotating rolls 300 on feed roll mechanisms 280, 281, respectively, in a reverse direction, feed roll mechanism 281 feeding the tree backward into the debarker 142 and feed roll mechanism 280 feeding the tree out of debarker 142 and backward toward delimber 140.

Referring now to FIGS. 21, 22, 23 and 24, cut-off knife 144 is positioned at the rear end of the machine and is mounted for limited movement toward and away from delimber 140 and debarker 142, to allow the knife to be actuated to sever the delimbed and debarked trunk without interfering with the movement of the trunk through the machine. Cut-off knife housing 310 is connected by collars 312 on its opposite side to cylindrical housings 314. The housings 314 are similar and each is carried in bearings 316, 318 fixed in tubular beam 150. For purposes of illustration and clarity, beam 150 is illustrated in section in FIG. 24 without support collar 152, delimber collar 176, debarker collar 284, or any of the other associated attachments, it being understood that beam 150 as shown in broken section in FIG. 24 is the full extent of the beam, the end of beam 150 shown at the left of FIG. 24 being the forward end of the beam adjacent delimber 140.

Rod 320 is fixed at one of its ends to the forward end of tubular beam 150 and extends within beam 150 and into housing 314. At its other end rod 320 is provided with nut 322 and ring 324, ring 324 fitting within housing 314. Each housing 314 is open at one of its ends and at its open end is provided with a seat 326 fixed by welding or in any other suitable manner. A compression spring 328 is positioned in each housing 314 and is seated at one of its ends on ring 324 and, at its opposite end, on seat 326.

As shown in FIGS. 21 and 22, knives 330, 332 are carried by yokes 334, 336 mounted for reciprocation toward and away from each other in knife housing 310. Housing 310 is open at its center to receive a tree trunk when knives 330, 332 are open or away from each other and, at each side, is provided with a cylinder 338, 340. Yoke 334, carrying knife 330 is provided at its opposite ends with piston rods and pistons 342, 344, piston 342 being positioned in cylinder 338 and piston 344 in cylinder 340. Yoke 336 is, likewise, provided with piston rods and pistons 346, 348, piston 346 being positioned in cylinder 338 and piston 348 in cylinder 340.

At its opposite ends, cylinder 338 is connected to fluid conduits 350, 352 and intermediate its ends with conduit 354. Similar conduits are connected to cylinder 340. The cylinder and piston arrangement is double acting, that is, the yokes and knives are actuated in both directions by fluid pressure. When fluid pressure is admitted through conduits 350, 352, the knives are actuated toward each other and when fluid pressure is admitted through conduit 354 the knives are withdrawn.

A spring biased, normally open switch 360 of a conventional type is attached to housing 310, actuating arm 362 of switch 360 being positioned with its forward or free end in the path of travel of yoke 334. Switch 360 is connected in circuit with switch 329 and, as will be more apparent hereinafter, is closed upon actuation of arm 362 by yoke 334. When knives 330, 332 are actuated, yoke 334 contacts arms 362 at the end of the yoke's inward travel.

In its normal position, with knives 330, 332 open, cut-off knife 144 is held in position adjacent the rearward ends of beams 150 by springs 328. When cylinders 338, 340 are actuated to move knives 330, 332 inwardly into contact with a tree trunk fed between knives 330, 332, the housing 310 is moved rearwardly by the advancing tree trunk, compressing springs 328. Compressed springs 328 serve to return housing 310 to its initial or forward position at the rearward ends of beams 150 when knives 330, 332 are moved outwardly out of engagement with the tree trunk.

At its rearmost end, beyond cut-off knife 144, frame 4 is provided with upstanding walls 400, 402, forming a compartment or box at the end of frame 4 into which length or bolts cut by cut-off knife 144 are received and automatically stacked. When a sufficient number of lengths or bolts have been cut, the lengths are removed and transported to the mill. If desired, frame 4 may be terminated beneath cut-off knife 144 and a truck or trailer can be positioned at the end of frame 4 behind cut-off knife 144 to receive cut tree lengths directly from the knife.

As aforestated, the various units of the machine are operated, preferably, from a central control point, such as from the operator's station on the tractor shown in FIG. 2 of the drawings, a control panel 410, such as shown in FIG. 2 being employed for this purpose. The control systems for the various units of the machine are shown schematically in FIGS. 25, 26 and 27. Power for the various units is provided from a pump or pumps driven from tractor motor 12. For ease of operation a plurality of pumps is preferred. In the embodiment of the invention illustrated in the attached drawings, three pumps 20, 22, 360, are employed.

As diagrammatically shown in FIG. 25, pump 20 provides power for one of the motors 18 operatively connected to one of the treads 10 of tractor 8, motor 28 which rotates frame 4 about a vertical axis on base 2 and, in addition, provides power for boom lift cylinders 97, guide roll cylinder 91 as well as boom winch motor 86 and motor 118 on grab 110. Pump 22, in FIG. 27, powers cylinders 338, 340 on cut-off knife 144 through check valve 362 and accumulator 364 and, in addition, powers the remaining motor 18 on the other track 10 of tractor 8. Pump 360, in FIG. 26, furnishes power to motor 286 on feed mechanism 280, 281, debarker motor 288, and delimber motor 190. Between the respective pump and each of the operating units an appropriate manually operated valve is provided for manual control of the operation of the respective unit.

In addition to manual control cut-off knife 144 may be controlled automatically to cut lengths or bolts of preset uniform length. As best shown in FIG. 27, a solenoid 374, having windings 376, 378, is connected to manually operated valve 372 of cut-off knife 144. Winding 376 of solenoid 374 is connected by suitable leads across a source of electromotive force, such as battery 377, through counter switch 329 (FIG. 10), and winding 378 is connected to the electrical source through switch 360. When counter switch 329 is closed, winding 376 of solenoid 374 is energized and moves the operator of valve 372 to the left, as shown in FIG. 27, into position to actuate knives 330, 332, inwardly to cut the tree. At the end of the cutting stroke, yoke 334 (FIG. 22) closes switch 360 actuating solenoid 376 to move the operator of valve 372 to the right, as shown in FIG. 27, into position to move knives 330, 332 outwardly and out of engagement with the tree. Counter switch 329 is set to close after each pre-set number of revolutions of roll 300 and actuates cut-off knife 144 to cut the tree into bolts of substantially uniform length. By disconnecting switches 329 and 360, cut-off knife 144 can be manually operated.

In operation, the apparatus of the invention is moved into position adjacent the butt ends of the felled trees, the operator regulating motors 18 on treads 10 through control valves 24, 26, respectively, to move the tractor into the desired position. Motor 28 is then operated to rotate frame 4 on base 2 to substantially align the grapple end of boom 40 with the butt end of the felled tree selected for processing by the operator and boom 40 is extended and pivoted on its horizontal axis so that the grapple jaws engage the tree trunk at a distance from the butt end of the trunk. Preferably, the tree trunk is engaged by the grapple jaws at a point between the butt end of the tree and the tree's center of gravity so that, as the butt end of the tree is elevated by the boom the top or far end of the tree remains resting on the ground.

With the grapple jaws in position around the tree trunk, valve 130 is shifted to close the grapple jaws and grasp the tree trunk between plates 112, 114 and plate 116. The butt end of the tree is then raised by positioning valve 103 to admit fluid to cylinders 97 raising the grapple end of boom 40 and motor 86 is actuated to retract the boom, pulling the butt end of the tree toward tractor 8 and delimber 140. As the butt end of the tree is moved toward delimber 140, the operator adjusts the height of guide roll 105 by regulating cylinder 91 bringing guide roll 105 into contact with the tree adjacent its butt end, and by controlling the height of the grapple end of boom 40 with cylinder 97 and guide roll 105 aligns the tree with the center of delimber 140 and feed roll mechanisms 280, 281.

As the butt end of the tree approaches delimber 140, control valve 191 on delimber motor 190 is positioned by the operator to rotate delimber housing 180 counterclockwise, moving arms 184 and cutter heads 182 outwardly, opening cutter heads 182 to receive the butt end of the tree trunk being fed toward the delimber by retracting boom 40. After the butt end of the tree is positioned between cutter heads 182, the operator repositions valves 191 reversing motor 190 and the rotation of housing 180 to bring cutter heads 182 into contact with the advancing tree.

By setting the controls on the respective motors, debarker 142 and feed roll mechanisms 280, 281 are placed in operation. These controls may be set and the operation of the debarker 142 and feed roll mechanism 280, 281 commenced by the operator at his convenience at any time before the tree is fed into feed roll mechanism 280.

With the cutter heads 182 in contact with the tree, the retraction of boom 40 by motor 86 continues, feeding the tree through the cutter heads which are revolving around the tree clockwise and, as they revolve, are rotating on their own individual axes counterclockwise as viewed in FIG. 11. As the tree trunk is fed by the retracting boom 40 through delimber 140 projections, such as limbs, extending outwardly from the trunk into the path of the revolving and rotating cutter heads are cut off, the delimbed butt end of the tree being fed by boom 40 into contact with spiked rolls 300 of feed roll mechanism 280.

Spiked rolls 300 of feed roll mechanism 280 are rotated in an infeed direction to feed the butt end of the delimbed tree into debarker 142 at substantially the same speed as the feed of the retracting boom 40. With feed roll mechanism 280 in driving contact with the tree, if desired, guide roll 105 may be elevated toward boom 40 and out of engagement with the tree by the operator by adjusting the valve control on cylinder 91 to retract piston and piston rod 93.

As the feed of the delimbed tree by retracting boom 40 and feed roll mechanism 280 continues, the butt end of the tree engages revolving blades 298 of debarker 142 forcing blades 298 outward on their spring tensioned pivotal mounting on revolving housing 296 as described in the aforecited patent to Brundell to remove the bark from the tree. The feed of the tree continues, the delimbed and debarked end of the tree feeding from the debarker into engagement with feed rolls 300 of feed roll mechanism 281 which are rotating at a speed commensurate with the feed speed of feed roll mechanism 280. Once the tree is in contact with the feed rolls of both mechanisms 280 and 281, the feed for processing the balance of the tree is through the feed roll mechanisms. With the tree in contact between the spiked rolls 300 of feed roll mechanisms 280 and 281, the grapple is opened by the operator, releasing the tree, and the control for motor 86 shifted, stopping retraction of boom 40.

After grapple 40 has been disengaged, the free end of the tree rests on and is dragged along the ground by the forward feeding action of the feed mechanisms 280, 281, thereby making it unnecessary to provide any other conveyor arrangement for the tree to maintain the axis of the tree in alignment with the feed axis of the mechanisms. This is facilitated and made possible by the pivotal mounting of beams 150 which serve to support the delimber 140, debarker 142 and cut-off knife 144 and maintain them in mutual axial alignment. Thus, the common feed axis of the delimber, debarker and cut-off knife is free to follow and remain in alignment with the tree, except as will be described hereinafter, as the axis of the tree changes. The orientation of the tree with respect to the apparatus may vary substantially as it is fed forward first by the grapple and then by the feed mechanisms 280, 281. The pivotal mounting of the beams 150 ensures minimization of bending moments which otherwise would result if the tree were not aligned with the feed axis of the delimber, debarker and cut-off knife and which, if great enough, would cause a malfunction of the apparatus due to one or more of the spring biased members such as the feed rolls 300 being forced radially outward.

From feed roll mechanism 281, the delimbed and debarked tree is fed by spiked rolls 300 between knives 330, 332. After a length of tree trunk has been fed past feed roll mechanism 281, pre-set counter switch 329 is automatically actuated and knife blades 330, 332 are moved inwardly into contact with the advancing tree trunk. When the knife blades contact the tree trunk, housing 310 is moved rearward by the advancing tree trunk, compressing springs 328. As housing 310 moves rearward, knives 330, 332 complete the cut whereupon yoke 334 closes switch 360 re-setting valve 372 to open the knives. As soon as the knives have cleared the butt end of the tree, springs 328 return housing 310 to its initial position to await subsequent operation by switch 329 or manual operation by the operator should such manual operation be desired.

To avoid undue pivotal movement of beams 152 and the mechanisms mounted thereon and shocks and stresses on spiked rolls 300 which might affect proper feeding and axial alignment of the tree, collars 152 and beams 150 are locked in position relative to the pivot axis when knife blades 330, 332 are in engagement with the advancing delimbed and debarked tree and knife housing 310 is spaced rearwardly away from delimber 142. This locking is accomplished automatically, when knife housing 310 is away from delimber 142, by valve 162 positioned in the by-pass line of cylinder 156.

Valve control 162a of valve 162 is positioned with its forward end in contact with knife housing 310 when housing 310 is adjacent delimber 142. On actuation of the knives 330, 332, knife housing 310 is moved away from delimber 142 by the advancing delimbed and debarked tree releasing actuator 162a, the spring carried in actuator 162a closing valve 162. With valve 162 closed, piston and piston rod 158 is locked in position, cylinder 156 locking beam 152 and preventing further pivotal movement of beams 152 with respect to supports 14, 16, respectively. When housing 310 is returned by compressed springs 328 to its original position valve 162 is reopened, unlocking piston and piston rod 158, allowing beams 152 to again pivot on supports 14, 16.

A manual valve on by-pass 160, open during the normal operation of the machine, is also provided for manually locking piston and piston rod 158 if locking is desired, for example, during moving of the machine.

As is apparent from the foregoing, once the felled tree is grasped by the grapple on the boom, the limbs and bark are removed from the tree and the delimbed and debarked tree is cut into predetermined lengths in a continuous operation. The entire processing operation is completed in a single operation. Once the butt end of the tree is aligned with the delimber and fed into the feed rolls, the machine handles the tree for delimbing, debarking and cutting, the operator merely determining that the controls for the various units are properly positioned. After the felled trees within the reach of the extended boom have been processed, the machine is readily moved by the operator to the next processing site, ready to process trees at the new site.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. In a machine for delimbing and debarking felled trees, a boom for feeding felled trees along an axial path into said machine, said boom comprising a support, a first member pivotally mounted on said support; a plurality of members telescoped within said first member, guide means on said first member and each of said plurality of members telescoped therein for supporting and guiding said plurality of members for movement into and out of said first member, means interconnecting said first member and said plurality of members for extending said plurality of members outwardly from said first member to lengthen said boom and for moving said members inward into said first member to shorten said boom, and a heeling means on said first member pivotally mounted on said support.

2. In a machine for delimbing and debarking felled trees, a boom for feeding felled trees along an axial path into said machine, said boom comprising a support, a first member pivotally mounted on said support, a plurality of members telescoped within said first member, guide means on said first member and each of said plurality of members telescoped therein for supporting and guiding said plurality of members for movement into and out of said first member, means interconnecting said first member and said plurality of members for extending said plurality of members outwardly from said first member to lengthen said boom and for moving said members inward into said first member to shorten said boom, means for actuating said interconnecting means, and a heeling means on said first member pivotally mounted on said support.

3. In a machine for delimbing and debarking felled trees, a boom for feeding felled trees along an axial path into said machine, said boom comprising a support, a first member pivotally mounted for rotation about a horizontal axis on said support, a plurality of members telescoped within said first member, a guide means on said first member and said plurality of members telescoped therein for supporting and guiding said plurality of members for movement into and out of said first member, means interconnecting said first member and said plurality of members for extending said plurality of members outward from one end of said first member to lengthen said boom and for moving said members inward into said first member to shorten said boom, a grapple fixed to the innermost of said plurality of members, said grapple including jaws pivotally mounted for movement about a substantially horizontal axis, means for pivoting said jaws about said axis to open and close said jaws, and a heeling means on said first member pivotally mounted on said support.

4. In a machine for delimbing and debarking felled trees, a boom for feeding felled trees along an axial path into said machine, said boom comprising a support, a first member pivotally mounted for rotation about a horizontal axis on said support, a plurality of members telescoped within said first member, first guide means on said first member and said plurality of members telescoped therein for supporting and guiding said plurality of members for movement into and out of said first member, means interconnecting said first member and said plurality of members for extending said plurality of members outward from one end of said first member to lengthen said boom and for moving said members inward into said one end of said first member to shorten said boom, a grapple fixed to one of said plurality of members, said grapple including jaws pivotally mounted, means for opening and closing said jaws, heeling means mounted on said boom intermediate said support and said grapple means, and means for independently raising and lowering said heeling means.

5. In a machine for delimbing and debarking felled trees, a boom for feeding felled trees into said machine, said boom comprising a support, a first member pivotally mounted for rotation about a horizontal axis on said support, means for pivoting said first member about said horizontal axis, a second member telescoped in said first member, a third member telescoped in said second member, a fourth member telescoped in said third member and extending outwardly therefrom, a grapple means mounted on the outward extending end of said fourth member, a plurality of jaws pivotally mounted on said grapple means, means for opening and closing said jaws, a guide roller mounted on said first member intermediate said support and said grapple means, means for raising and lowering said guide roller, means interconnecting said first member, said second member, said third member and said fourth member for moving said second member, said third member and said fourth member outwardly and inwardly with respect to said first member, means for selectively operating said interconnecting means and means mounted intermediate said first, second, third and fourth members for guiding and supporting said members for movement into and out of each other.

6. A boom for feeding a selected prefelled tree along an axial path, said boom comprising: a support mounted for rotation around a vertical longitudinal axis; a first member pivotally mounted on said support for limited movement about said pivot whereby an extremity of said member may be raised or lowered, means for raising and lowering said extremity and means for actuating said means; a plurality of members telescoped within said first member; guide means comprising cooperating rollers on said telescoped members cooperating with said fixed and said telescoped members for supporting and guiding said plurality of members for movement into and out of said first member and of each other; means interconnecting said first member and said plurality of members for simultaneously extending said plurality of members outwardly from said first boom and relative to each other to lengthen said boom and for moving said members inward simultaneously into said first member and with respect to each other to shorten the boom; means for actuating said interconnecting means; a grapple fixed to the innermost of said plurality of members; said grapple including jaws pivotally mounted for movement about a substantially horizontal axis; means for pivoting said jaws about said axis to open and to close said jaws; and a heeling means on said first member pivotally mounted on said support.

7. The boom of claim 6 wherein said guide means comprising cooperating wheels running between spaced apart longitudinal tracks within said telescoped member and rollers exteriorly of, but associated with, said telescoped members for supporting and guiding said plurality of members for movement into and out of said first member and of each other; means interconnecting said first member and said plurality of members for simultaneously extending said plurality of members outwardly from said first boom and relative to each other to lengthen said boom and for moving said members inward simultaneously into said first member and with respect to each other to shorten the boom; means for actuating said interconnecting means; a grapple fixed to the innermost of said plurality of members said grapple including jaws pivotally mounted for movement about a substantially horizontal axis; and means for pivoting said jaws about said axis to open and to close said jaws.

8. The boom of claim 6 wherein said interconnecting means includes a bidiameter winch drum drivenly mounted on said first fixed member; a first cable wound on a large diameter of said bidiameter winch drum, entraining a first pulley at the outer end of said first fixed member and operatively associated with the inner end of the first telescoping member of said plurality of members; a plurality of interconnecting means, each connected at one end to an outer member of said telescoping members and at the opposite end to an inner of said telescoping members; and a cable operatively associated with the innermost telescoped member and wound on the small diameter of said winch drum, the ratio of the large diameter to the small diameter being equal to the number of movable telescoped members.

9. The boom of claim 7 wherein said interconnecting means includes a bidiameter winch drum drivenly mounted on said first fixed member; a first cable wound on a large diameter of said bidiameter winch drum entraining a first pulley at the outer end of said first fixed member and operatively associated with the inner end of the first telescoping member of said plurality of members; and a cable operatively associated with the innermost telescoped member and wound on the small diameter of said winch drum, the ratio of the large diameter to the small diameter being equal to the number of movable telescoped members.

References Cited by the Examiner

UNITED STATES PATENTS

| | | | |
|---|---|---|---|
| 2,541,045 | 2/1951 | Ferwerda et al. | 214—147 X |
| 2,819,803 | 1/1958 | Obenchain | 212—55 |
| 2,903,294 | 9/1959 | Shook | 214—147 X |
| 3,165,215 | 1/1965 | Larson | 214—147 |

HUGO O. SCHULZ, *Primary Examiner.*